United States Patent
Miyata et al.

(10) Patent No.: US 8,299,676 B2
(45) Date of Patent: Oct. 30, 2012

(54) AXIAL GAP TYPE CORELESS ROTATING MACHINE

(75) Inventors: Koji Miyata, Tokyo (JP); Minori Miyata, legal representative, Fukui (JP); Atsushi Miyata, legal representative, Fukui (JP); Hideki Kobayashi, Tokyo (JP); Naoki Watanabe, Tokyo (JP); Takehisa Minowa, Tokyo (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 225 days.

(21) Appl. No.: 12/676,062

(22) PCT Filed: Sep. 10, 2008

(86) PCT No.: PCT/JP2008/066310
§ 371 (c)(1),
(2), (4) Date: Jun. 16, 2010

(87) PCT Pub. No.: WO2009/034991
PCT Pub. Date: Mar. 19, 2009

(65) Prior Publication Data
US 2010/0253173 A1  Oct. 7, 2010

(30) Foreign Application Priority Data
Sep. 14, 2007 (JP) ................................. 2007-238979

(51) Int. Cl.
*H02K 17/00* (2006.01)
(52) U.S. Cl. ........ 310/208; 310/266; 310/268; 310/112; 310/114
(58) Field of Classification Search .......... 310/201–208, 310/112–114, 266, 268
See application file for complete search history.

(56) References Cited

U.S. PATENT DOCUMENTS

| 4,371,801 | A | * | 2/1983 | Richter | 310/156.36 |
|---|---|---|---|---|---|
| 5,945,766 | A | * | 8/1999 | Kim et al. | 310/268 |
| 6,049,197 | A | * | 4/2000 | Caamano | 322/89 |
| RE38,939 | E | * | 1/2006 | Kessinger et al. | 310/268 |
| 7,098,566 | B2 | * | 8/2006 | Rajasingham | 310/208 |

FOREIGN PATENT DOCUMENTS

| JP | 55-122308 | 8/1980 |
|---|---|---|
| JP | 11-113204 | 4/1999 |
| JP | 11-187635 | 7/1999 |
| JP | 2002-320364 | 10/2002 |
| JP | 2003-348805 | 12/2003 |

OTHER PUBLICATIONS

International Search Report corresponding to International Application No. PCT/JP2008/066310 mailed Nov. 25, 2008.

* cited by examiner

*Primary Examiner* — Dang Le
(74) *Attorney, Agent, or Firm* — Myers Bigel Sibley & Sajovec, P.A.

(57) ABSTRACT

A high-output and highly efficient axial gap type rotating machine capable of reducing an eddy current generated in a winding wire and supplying a larger current is provided. The axial gap type rotating machine may include a housing, a rotating shaft rotatably supported in the housing; two rotors capable of rotating integrally with the rotating shaft, and a stator fixed to the housing, the stator disposed in an air gap formed by the rotating plates disposed to face each other, the stator including a fixing plate and coils disposed in a circle on the fixing plate so as to face the circles of the permanent magnets, wherein each of the coils includes a winding wire formed by a bundle of at least two coil conductors having rectangular cross sections by aligning at least one of long sides and short sides thereof, and the winding wire has an outer circumference covered with an insulating coating and is wound such that the long sides in cross section of the coil conductors are positioned perpendicular to the magnetic pole surfaces of the permanent magnets.

7 Claims, 11 Drawing Sheets

AXIAL GAP TYPE CORELESS ROTATING MACHINE

RELATED APPLICATIONS

This application is a 35 U.S.C. §371 national stage application of PCT Application No. PCT/JP2008/066310, filed on Sep. 10, 2008, which claims priority from Japanese Application No. 2007-238979 filed Sep. 14, 2007, the contents of which are incorporated herein by reference in their entireties. The above-referenced PCT International Application was published in the English language as International Publication No. WO 2009/034991 A1 on Mar. 19, 2009.

TECHNICAL FIELD

The present invention relates to a synchronous-type permanent-magnet rotating machine such as a motor or an electric generator, and more particularly relates to an axial gap type coreless rotating machine having a rotor and a stator facing each other in a direction of rotating axis.

BACKGROUND ART

A permanent-magnet rotating machine is structurally categorized into a radial gap type and an axial gap type. In the radial gap type, a plurality of permanent magnets are arranged in a circumferential direction of a rotor, magnetic poles of the permanent magnets are aligned in a radial direction, and a stator is arranged in a manner to face the permanent magnets. Generally in the radial gap type, the individual stator coils are wound around an iron core having a plurality of teeth, so that magnetic fluxes from the rotor poles can efficiently link with the coils, and a large torque for a motor and a large voltage for a generator can be generated. In contrast, since an iron core is used, there is caused a loss in torque based on a cogging torque or a hysteresis loss of the iron core, and, thereby, a starting torque is increased. If such a structure is used for a wind power generator and the starting torque is too large, the generator can not be rotated by a weak wind and can not generate electricity.

If the iron core is removed, such a problem is not caused. This, however, causes the magnetic efficiency to deteriorate, and it is impossible to obtain a large output in the radial gap type. In view of this, an axial gap type as shown in FIG. 8 is proposed.

In FIG. 8, a plurality of layers of disk-shaped magnetic bodies (rotor yokes) 25 comprising a plurality of permanent magnets 26a on the surface thereof are secured together through spacers to be fitted to a rotating shaft 22 and integrally formed therewith, resulting in a formation of a rotor 27. In air gaps formed between individual rotor yokes, a stator 1 comprising coils 3 is disposed and fixed to a housing 21. The rotating shaft 22 is rotatably supported by the housing 21 through bearings 28. According to this structure, it is possible to increase the output by enlarging the magnetic pole surfaces of the permanent magnets 26a without using iron cores for the coils 3. Since the axial gap type rotating machine has a structure using no iron cores for the coils (called "coreless"), it is possible to obtain a high-output rotating machine as it has no starting torque (for example, refer to such publications as Japanese Patent Provisional Publication (JP-A) No. 2002-320364 and JP-A No. 2003-348805). According to the coreless rotating machine, it has a smaller internal loss and offers a high output and highly efficient performance even at a high rotation speed, because the inductance of the winding is small, which makes the impedance thereof low. For example, when the coreless rotating machine is used as a coreless power generator, since the internal loss is a result of the product of the impedance and the current, it is possible to supply therefrom a larger current as the impedance thereof is smaller. The coreless rotating machine has an advantage for such an application to which a larger current is supplied. However, it is to be noted that the magnitude of current that is allowed to flow is decided by a cross-sectional area of the winding wire as the heat generation in the coil should be restricted and is supposed to be restricted at 5 to 15 A per 1 $mm^2$ cross-sectional area of the winding wire.

Patent Document 1: 2002-320364A
Patent Document 2: 2003-348805A

SUMMARY OF THE INVENTION

Problem to be Solved by the Invention

It is preferable to wind a winding wire having a rectangular cross section rather than that having a circular cross section in order to increase the space factor and achieve a higher output. In view of this, the inventors manufacture a coil wound with a wire having a rectangular cross section of 1.6 mm×1.25 mm with a cross-sectional area of 2 $mm^2$ to obtain a current of 30 A, and used the coil in an axial gap type coreless generator. When the axial gap type coreless generator was rotated at 3600 rpm, the coil generated heat despite no load was connected thereto, in which no current flowed through the coil. Such generation of heat results in an internal loss of the generator and causes the generation efficiency to decrease. The inventors investigated the cause of the heat generation and found that an eddy current flowed annularly inside the winding wire and generated heat when the magnetic field was linked with the winding wire of the coil. As a method for reducing the eddy current, making the winding wire thinner may be conceived. However, such a method prevents a larger current from flowing.

Means for Solving the Problem

In view of the problems described above, it is an object of the present invention to provide a high-output and highly efficient axial gap type rotating machine capable of reducing the eddy current caused inside the winding wire and supplying a larger current.

The inventors' intensive study to solve the above problem achieved a high-output and highly efficient axial gap type rotating machine capable of reducing eddy current generated inside the winding wire and supplying a larger current. The axial gap type rotating machine of the invention may comprise: a housing; a rotating shaft rotatably supported in the housing; two rotors capable of rotating integrally with the rotating shaft, the rotor comprising rotating plates disposed to face each other with a distance therebetween in an axial direction of the rotating shaft, and permanent magnets disposed in a circle around the rotating shaft on at least one of opposing faces of the rotating plates disposed to face each other so that magnetic pole surfaces of the permanent magnets are positioned perpendicular to the rotating shaft; and a stator fixed to the housing, the stator disposed in an air gap formed by the rotating plates so as to face each other, the stator comprising a fixing plate and coils disposed in a circle on the fixing plate so as to face the circles of the permanent magnets, wherein each of the coils comprises a winding wire formed by a bundle of at least two coil conductors having rectangular cross sections by aligning at least one of long sides and short sides thereof, and the winding wire has an outer circumference covered with an insulating coating and is wound such that the long sides in cross section of the coil conductors are positioned perpendicular to the magnetic pole surfaces of the permanent magnets.

According to another aspect of the present invention, the axial gap type rotating machine may comprise: a housing; a rotating shaft rotatably supported in the housing; a first end rotor and a second end rotor capable of rotating integrally with the rotating shaft, being disposed to face each other with a distance therebetween in an axial direction of the rotating shaft, comprising respective end rotating plates; at least one double-sided magnet rotor capable of rotating integrally with the rotating shaft, each double-sided rotor being disposed in an air gap formed between the first and second end rotors, comprising a rotating plate and permanent magnets concentrically disposed around the rotating shaft on both sides of the rotating plate so that magnetic pole surfaces are positioned perpendicular to the rotating shaft; and at least two stators fixed to the housing, each stator disposed in an air gap formed between the first end rotor, said double-sided magnet rotor, and the second end rotor, comprising fixing plates and coils disposed circumferentially at each of the fixing plates so as to face circles of the permanent magnets, wherein each of the coils comprises a winding wire formed by a bundle of at least two coil conductors having rectangular cross sections by aligning at least one of long sides and short sides thereof, and the winding wire has an outer circumference covered with an insulating coating and is wound such that the long sides in each of the cross sections of the coil conductors are positioned perpendicular to the magnetic pole surfaces of the permanent magnets.

According to still another aspect of the present invention, the axial gap type rotating machine may be structured in such a way that permanent magnets are further provided on opposing faces of the end rotating plates of the first and second end rotors such that magnetic pole surfaces of the permanent magnets are positioned perpendicular to the rotating shaft.

According to the axial gap type rotating machine of the present invention, it is preferable that the cross section of the coil conductors has a shape in which the ratio of the length of the long sides to the length of the short sides is at least five.

According to the axial gap type rotating machine of the present invention, it is preferable that the length of the short sides in cross section of the coil conductors be not more than 0.5 mm.

According to the axial gap type rotating machine of the present invention, an outer circumference of each of the coil conductors may be covered with an insulating coating.

Effect of the Invention

According to the present invention, it is possible to achieve a high-output and highly efficient axial gap type coreless rotating machine even though the cross-sectional area of the winding wire thereof is such that is capable of passing a larger current.

EXPLANATIONS OF LETTERS AND NUMERALS

Figure 1:
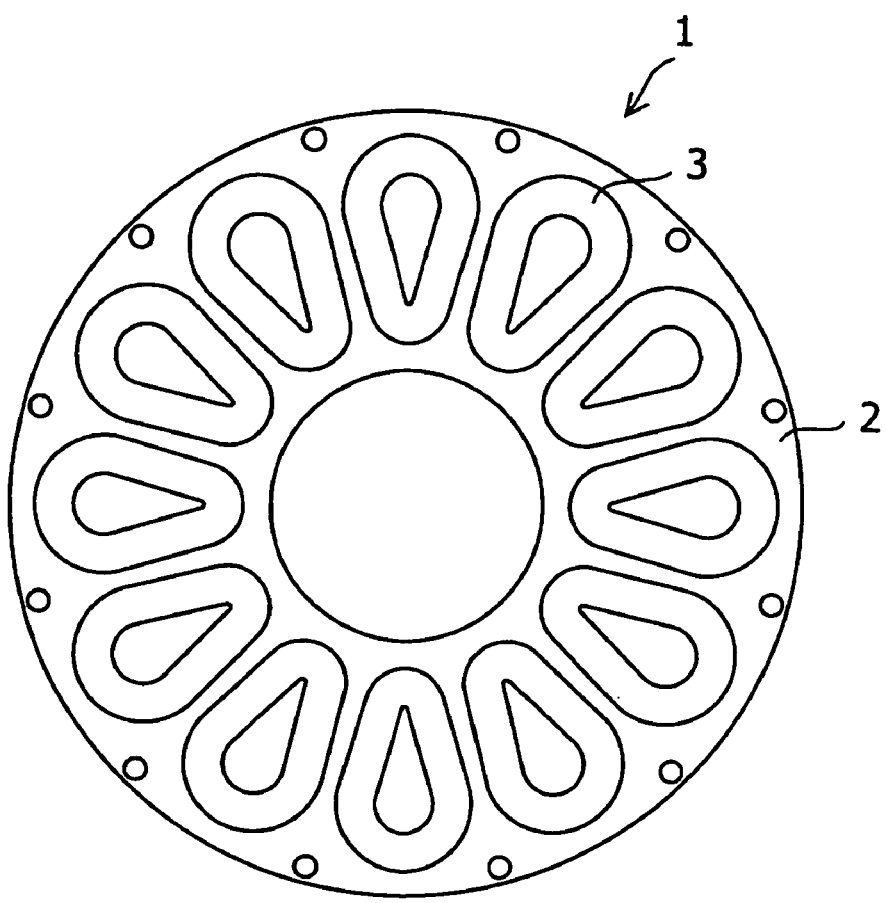
FIG. 1 is a cross sectional schematic view showing a rotor of the rotating machine according to the present invention.

1 stator
2 coil base
3 coil
4 coil winding wire
5 coil conductor
6 insulating coating
7 permanent magnet
8 magnetic flux
9 eddy current
10 coil maker
11 conductor supplying section
12 conductor assembling section
13 coil winding section
14 coil conductor sources
15 rotating body
16 hollow coil frame
20, 30, 40, 50 axial gap type rotating machine

BEST MODE FOR CARRYING OUT THE INVENTION

Hereinafter, the present invention will be described in detail with reference to the drawings.

A stator of an axial gap type rotating machine according to the present invention is shown in FIG. 1. In FIG. 1, the stator 1 has 12 pieces of coils 3 disposed in a circle and spaced equally from each other about the rotating shaft of a coil base (fixing plate) 2. The number of coils is decided in accordance with the number of poles of the rotor or whether the coils are connected in a single-phase manner or a triphasic manner. It is common to set the ratio of the number of poles to the number of coils as 1:1 for the single phase and 4:3 for the three-phase, and it is also possible to set the ratio as 16:9, 20:12, or the like. In the example shown in FIG. 1, 12 pieces of coils are connected in a triphasic manner so as to obtain a triphasic output with a rotor having 16 poles.

Note that the stator is not limited to the one having the coils disposed in a single circle around the rotating shaft in the coil base 2 as shown in FIG. 1, but it is also possible to adopt a so-called multi-circumferential structure by disposing the coils in at least two concentric circles having different diameters around the rotating shaft on the coil base 2. In such a case, the permanent magnets are provided concentrically in each circle having different diameter on a rotating plate, so that each concentric circles of the rotating plate corresponds to the concentric circles of the fixing plate on which the coils are disposed.

The structure of the winding wire used for the above-mentioned stator will be described further in detail with reference to FIG. 2. As shown in (a) to (c) of FIG. 2, the coil 3 is formed by winding a coil winding wire 4 having a plate-like shape and an insulating coating 6 applied on an outer surface thereof. Furthermore, as shown in FIG. 2(d), the coil winding wire 4 having a plate-like shape is composed of a total of 18 coil conductors 5 having rectangular cross sections of which long sides and short sides are aligned with each other.

It is preferable that the thickness of the insulating coating 6 of the coil winding wire 4 be in the range of 0 to 50 μm and more preferably in the range of 20 μm to 30 μm from the view point of reducing the eddy current. Additionally, the enamel coating may be applied as the insulating coating of the winding wire.

Figure 3:
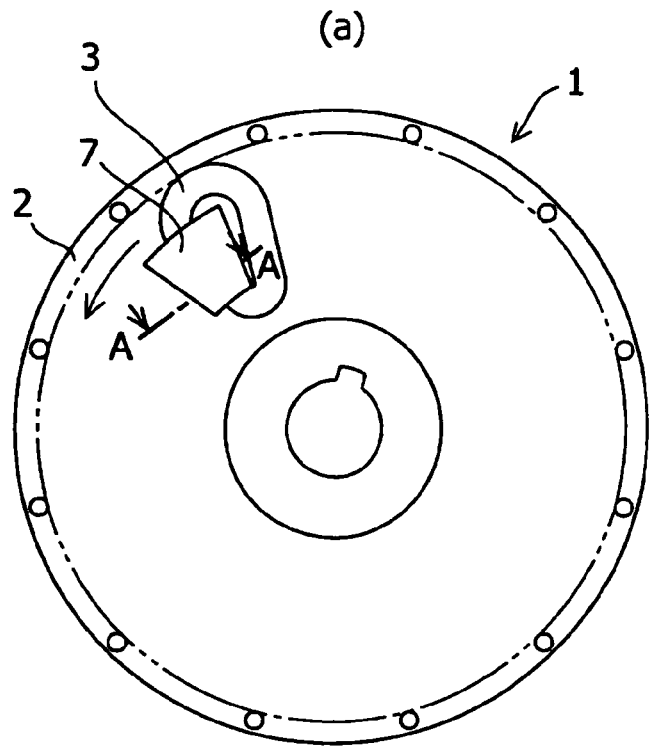
FIG. 3 is a front elevation, viewed in a direction of rotation axis, showing how a magnet of the rotor passes above a stator of the rotating machine according to the present invention.
Figure 3:
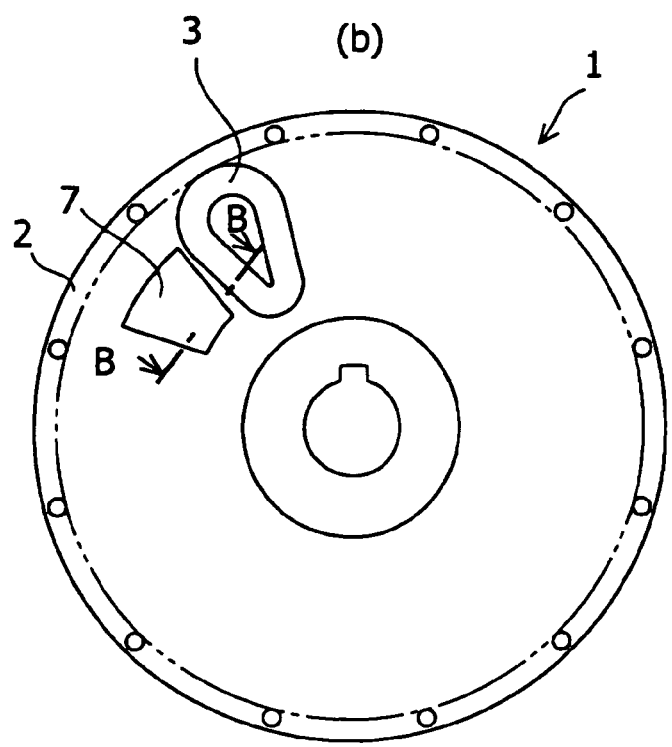
Figure 4:
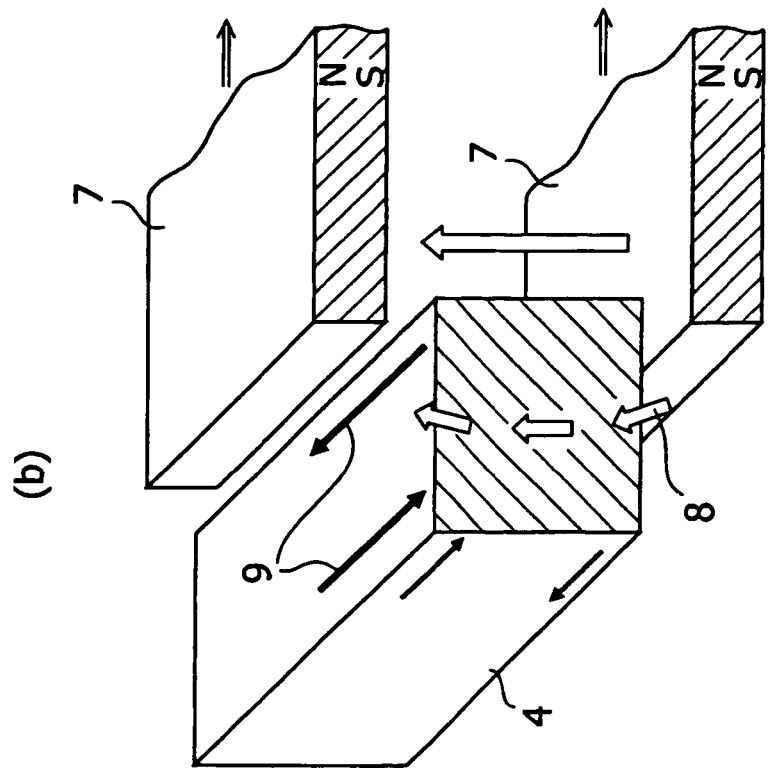
FIG. 4 depicts views, taken along line A-A and line B-B in FIG. 3, showing how a magnet of the rotor passes above a stator of the rotating machine according to the present invention.
Figure 4:
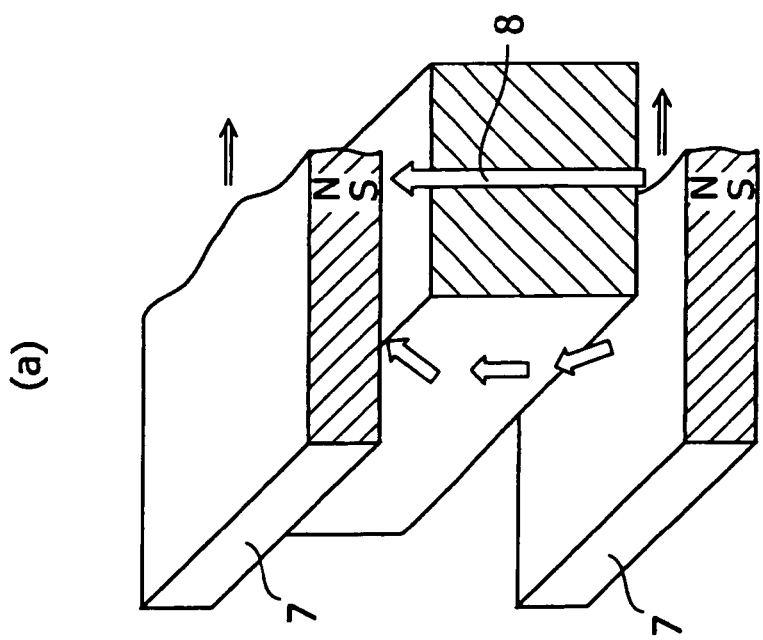

With reference to FIGS. 3 and 4, a description will be given of an eddy current flowing through inside the plate-like coil winding wire 4 when the axial gap type rotating machine is driven. FIG. 3(a) shows a state in which the permanent magnet 7 of the rotor, along with the rotation of the rotating shaft, reaches above the winding wire 4 of a specific coil 3 that is disposed concentrically around the rotating shaft. The cross sectional view taken along line A-A in this state corresponds to of FIG. 4(a).

In FIG. 3(b), the rotor further rotates, and the permanent magnet 7 is about to leave from above the winding wire 4 of the specific coil 3. In this state, the cross sectional view taken along line B-B corresponds to FIG. 4(b). During the transition from the state shown in section FIG. 3(a) to the state shown in FIG. 3(b), the magnetic flux 8 penetrating inside the winding wire 4 decreases constantly as shown in (a) and (b) of FIG. 4. Then, an eddy current 9 (induced current) flows inside the winding wire 4 in such a way to prevent the magnetic flux from decreasing. Since the eddy current 9 flows in a larger amount through a face through which the magnetic flux penetrates, the eddy current flows more through a face which is parallel with the magnetic pole surface than through a face which is parallel with the magnetic flux. This means that more current flows through the upper and lower faces as shown in FIG. 4(b). Accordingly, the inventors thought that, if a face parallel with the magnetic pole surface is divided into smaller segments in a coil of an axial gap type rotating machine, it served effectively in reducing the eddy current by fragmenting an eddy current path way, and conceived an idea of making the winding wire by bundling at least two coil conductors having an identical cross sectional shape together in such a way that long sides and/or short sides in cross section of the conductors are aligned together as described above.

It is preferable that the coil conductors 5 that form the winding wire have a rectangular shape in cross section. It is also preferable that each of the conductors 5 be covered with the insulating coating 6 as shown in FIG. 2(e) in view of reducing the eddy current. However, since a thicker insulating coating 6 reduces the space factor of the winding wire and causes a deduction in output power, a thinner insulating coating is better and, for example, an enamel wire can be employed preferably. Since the effect in reducing the eddy current can be still provided even without the insulating coating, the insulating coating of the coil conductors 5 is not an essential requirement. When the insulating coating 6 is applied to the coil conductors 5, the thickness of the coating is preferably in the range of 0 to 50 μm, and more preferably in the range of 20 to 30 μm in view of reducing the eddy current. In addition, it is also possible to employ a similar material for the insulating coating of the coil conductors 5 as for the insulating coating of the winding wire.

As to the size of the conductors, such a size by which the eddy current is difficult to flow is selected. The size by which the eddy current is difficult to flow varies according to the number of poles, the rotation speed, the magnetic field strength, and the like, and it is possible to calculate the size based on a magnetic field simulation using the finite element method or the like.

It is preferable that the length of the short side in cross section of the conductors be 0.5 mm or smaller. Although the reduction in size of the long side in cross section of the conductors leads to the reduction in eddy current, too thin conductors make the winding work difficult and lower the space factor of the winding wire. The long side in cross section of the conductors, i.e., the side positioned perpendicular to the magnetic pole surface of the permanent magnet when the coil is disposed in the rotating machine, does not need to have a small value as the short side in cross section of the conductors, i.e., the side positioned parallel to the magnetic pole surface of the permanent magnet. It is preferable that the shape of the cross section of the coil conductors have a relation in which the ratio of the length of the long side in cross section to the length of the short side in cross section is at least five (the ratio≧5).

Figure 5:
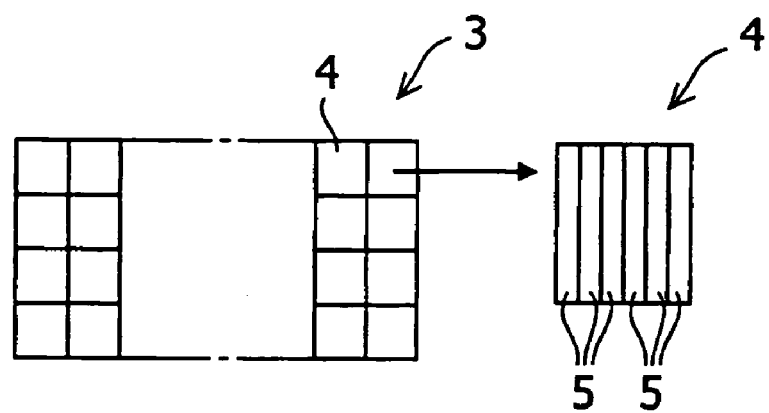
FIG. 5 shows a cross sectional view of a coil according to another aspect accommodated in the stator, taken along line A-A in FIG. 1 and a schematic view thereof showing an array of conductors of a single winding wire.
Figure 6:
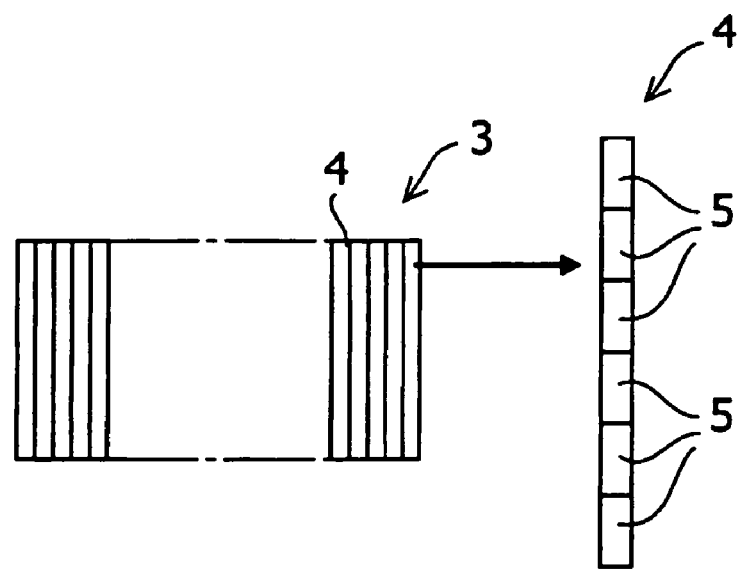
FIG. 6 shows a cross sectional view of a coil according to another aspect accommodated in the stator, taken along line A-A in FIG. 1 and a schematic view thereof showing an array of conductors of a single winding wire.

FIGS. 5 and 6 show other aspects of the coil used in the rotating machine according to the present invention. In FIG. 5, the coil conductors that form the winding wire are common to the aspect shown in FIG. 2 with respect to the rectangular cross section but are different from the aspect shown in FIG. 2 with respect that the coil is formed by winding a winding wire having a square cross section.

Figure 2:
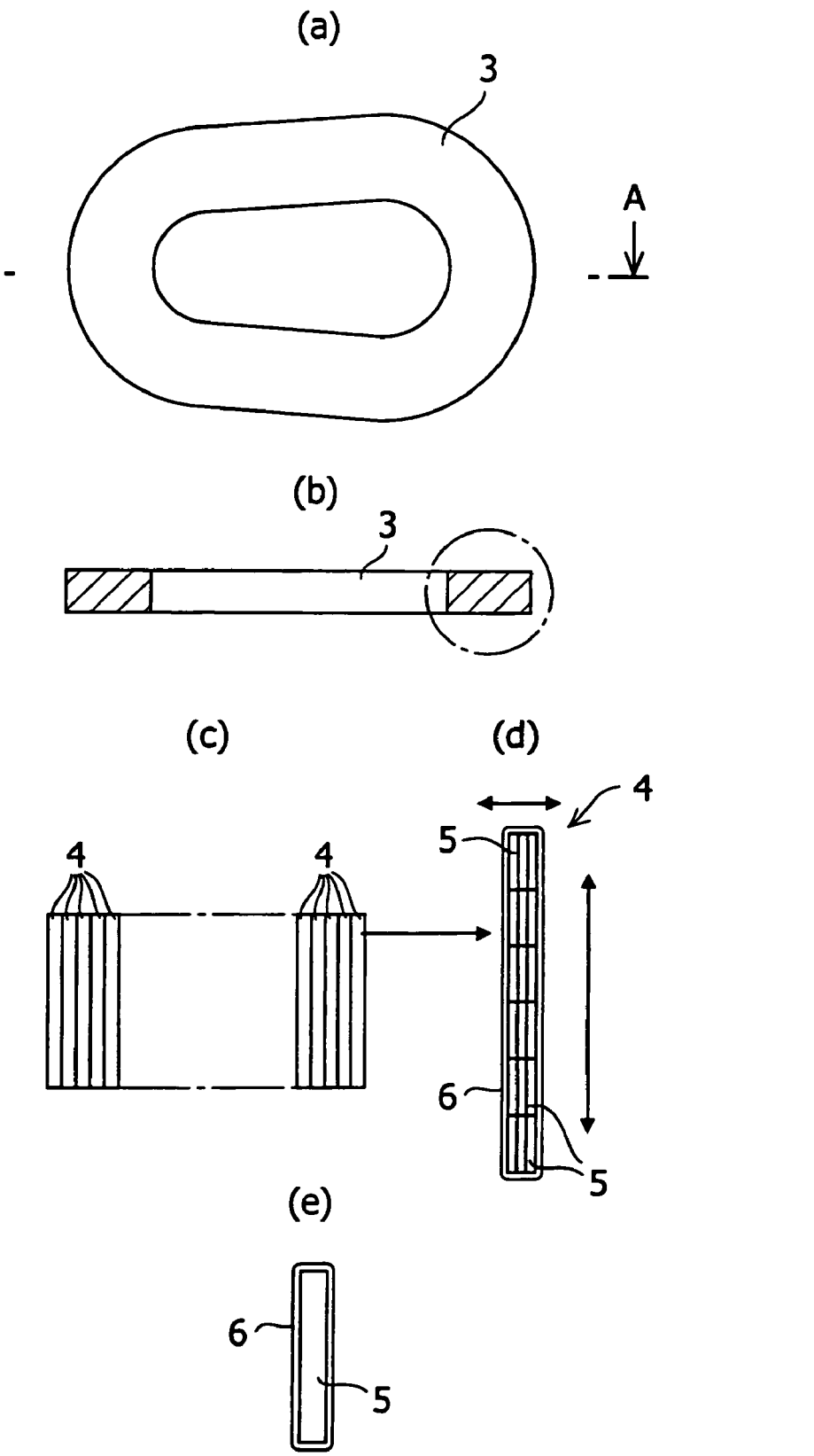
FIG. 2 shows, in (a), a coil according to one aspect accommodated in the rotor shown in FIG. 1; in (b), a cross sectional view as cut along line A-A shown in FIG. 1; and, in (c), an enlarged view thereof.

In FIG. 6, the aspect is common to that shown in FIG. 2 with respect that the coil is formed by winding a winding wire having a rectangular cross section. However, the short side in cross section of the coil conductors is larger than that shown in FIG. 2.

However, in each of these coils, the length of the short side in cross section of the conductors that form the winding wire is set at 0.5 mm or smaller.

Figure 7:
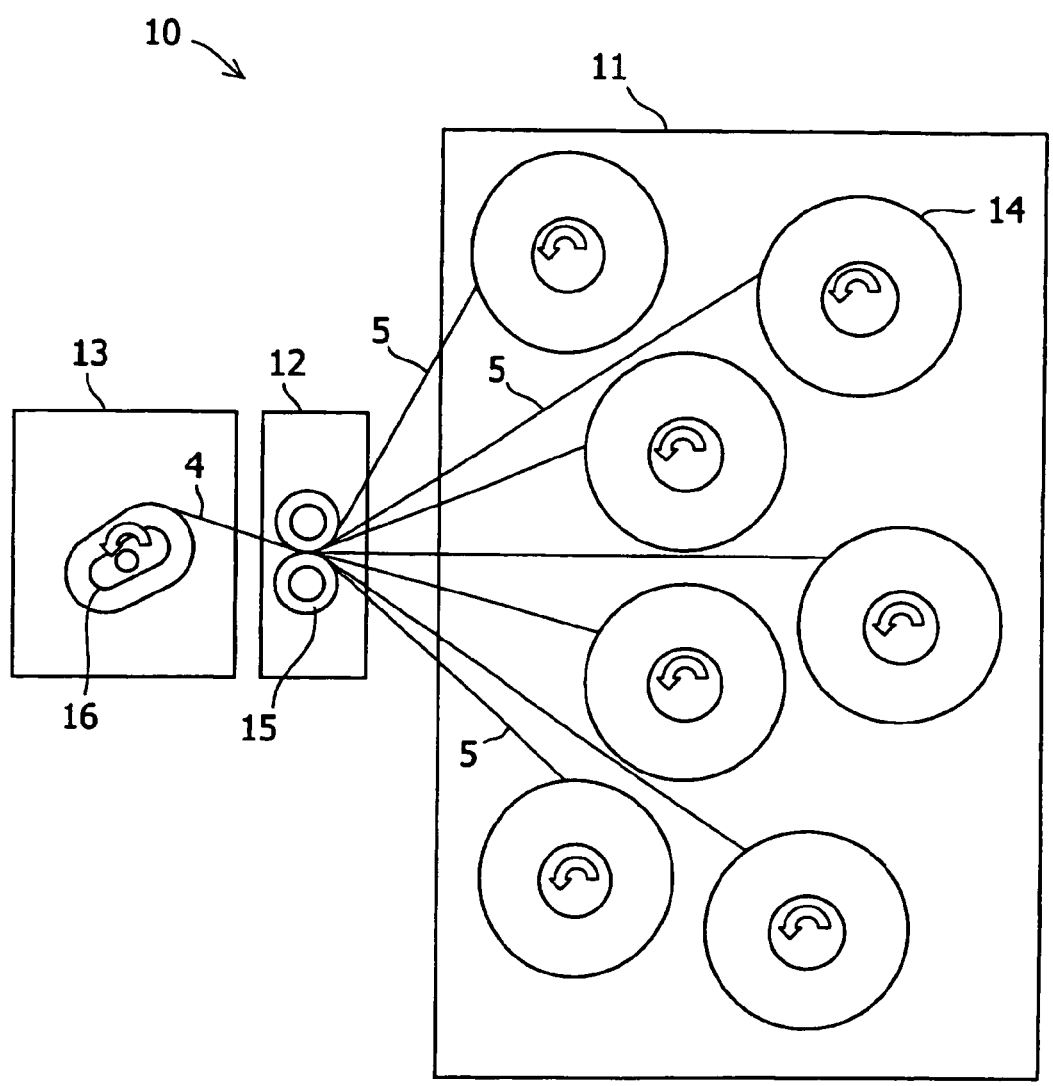
FIG. 7 is a schematic diagram showing examples of a method and an apparatus for producing the coil accommodated in the stator shown in FIG. 1.

FIG. 7 shows one example of a method for producing the coil winding wire and the coil described above. The coil maker 10 shown in FIG. 7 comprises: a conductor supplying section 11 having seven coil conductor sources 14 for feeding out the coil conductors 5 by rotation; a conductor assembling section 12 for making a single string of the winding wire 4 having a rectangular cross section by rolling in and bundling together the conductors 5 supplied from the conductor supplying section by two rotating bodies 15 rotating in directions opposite to each other; and a coil winding section 13 for winding the coil winding wire 4 obtained in the conductor assembling section around a hollow coil frame 16. For example, the coil can be obtained by such a production apparatus as described above. It is also possible to provide, between the conductor assembling section 12 and the coil winding section, a coating section for applying an insulating coating to the winding wire obtained in the conductor assembling section 12.

The rotor comprising the coils can preferably be used for the axial gap type rotating machines shown in FIGS. 8, 10, 11, and 12.

Figure 8:
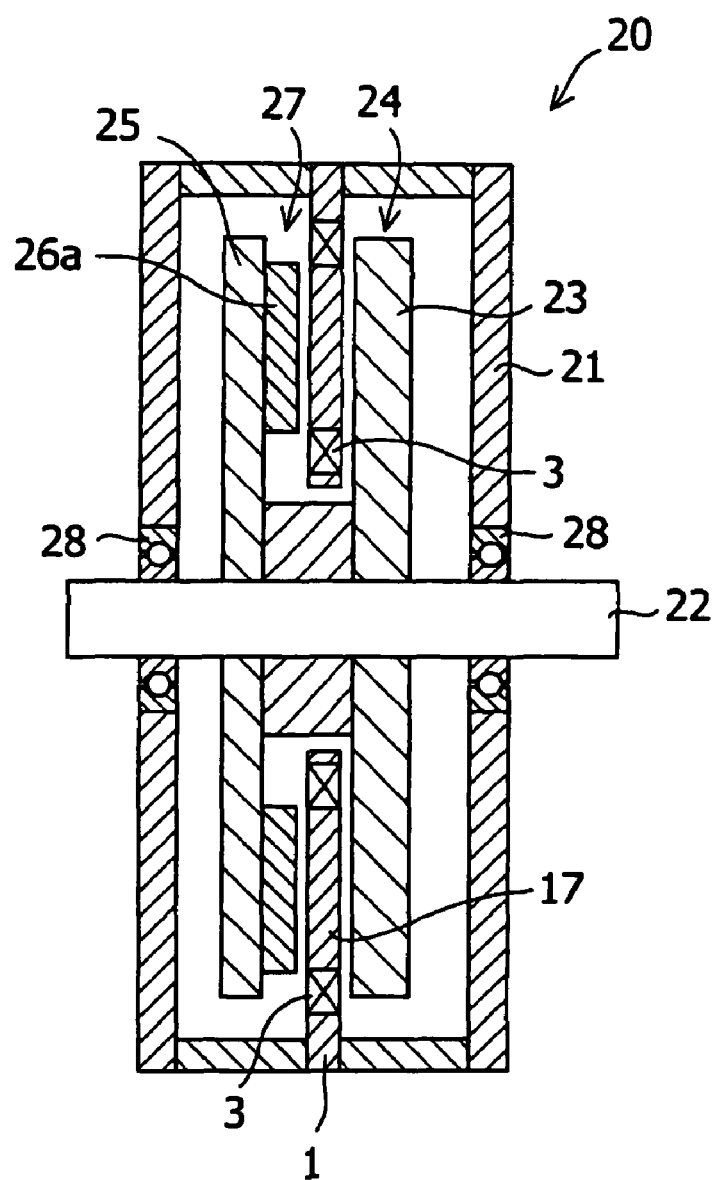
FIG. 8 is a schematic cross sectional view showing one aspect of an axial gap type rotating machine according to the present invention.

The axial gap type rotating machine 20 shown in FIG. 8 comprises: a housing 21; a rotating shaft 22 rotatably supported in the housing 21; two rotors 24 and 27 capable of rotating integrally with the rotating shaft, comprising rotating plates 23 and 25 disposed to face each other with a distance therebetween in an axial direction of the rotating shaft 22, and permanent magnets 26a disposed concentrically around the rotating shaft on one of opposing faces of the rotating plates 23 and 25 so that magnetic pole surfaces of the permanent magnets are positioned perpendicular to the rotating shaft; and a stator fixed to the housing, comprising a fixing plate 1 disposed in the air gap formed between the rotating plates 23 and 25 facing each other, and coils 3 disposed in a circle at the fixing plate so as to face in a circle of the permanent magnets.

The magnetic fluxes generated from the permanent magnets of the rotor intermittently link with the inside of each of the coils 3 that are disposed concentrically as the rotating shaft rotates.

Figure 9:
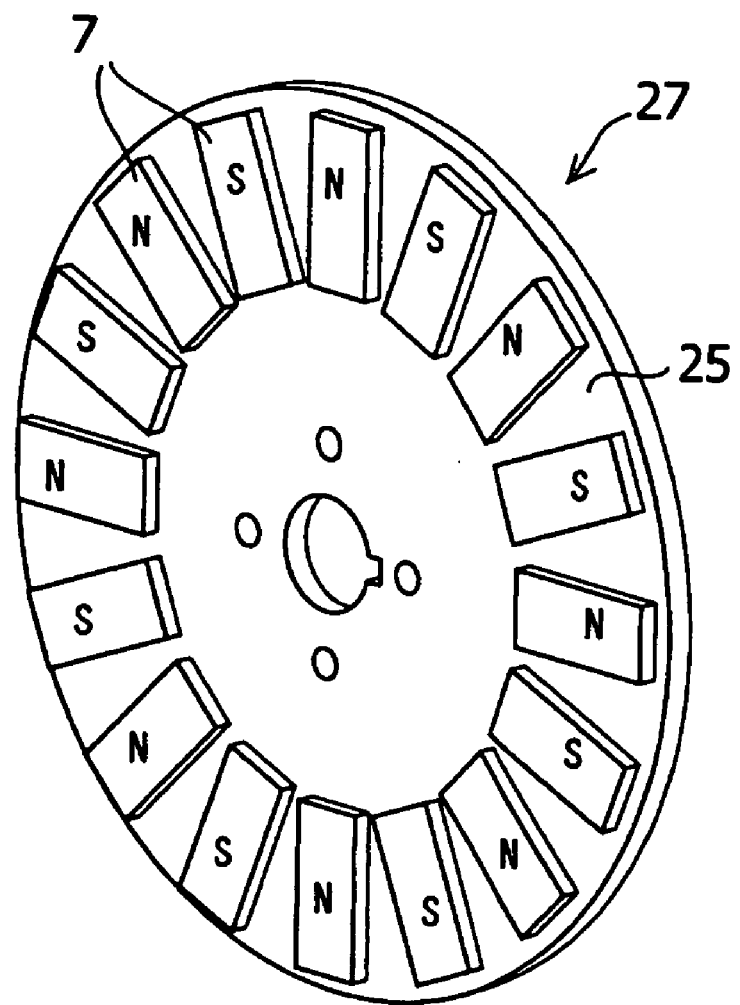
FIG. 9 is a schematic perspective view showing a rotor that can be employed in an axial gap type rotating machine according to the present invention.

FIG. 9 discloses the rotor 27 used in the axial gap type rotating machine 20. The rotor 27 has 16 pieces of the permanent magnets 7 disposed on the surface of the rotor yoke 25 so that the poles thereof alternate. The number of the permanent magnets is an even number. It is possible to obtain a high output power by using an Nd—Fe—B base sintered magnet having a strong magnetic force as the permanent magnets.

Figure 10:
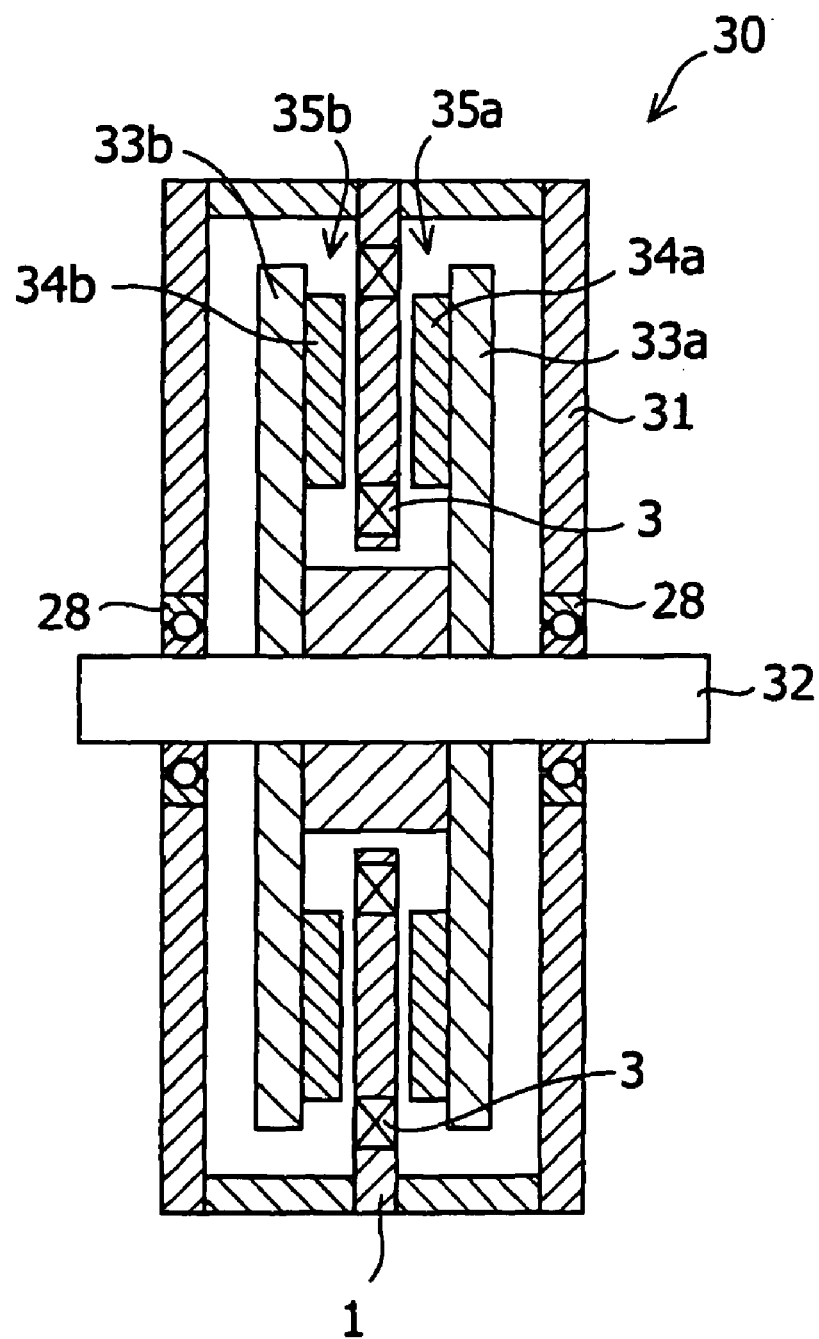
FIG. 10 is a schematic cross sectional view showing another aspect of an axial gap type rotating machine according to the present invention.

The axial gap type rotating machine 30 shown in FIG. 10 is different from the aspect shown in FIG. 8 in that the permanent magnets 34a and 34b are disposed concentrically around the rotating shaft 32 on both of the faces of the rotating plates 35a and 36b which are facing each other so that the magnetic pole surfaces are positioned perpendicular to the rotating shaft.

According to the aspect shown in FIG. 10, since the permanent magnets are disposed on both of the surfaces of the rotating plate (rotor yoke), it is possible to improve the magnetic efficiency as compared with the aspect shown in FIG. 8. The rotating plate may be formed by embedding a magnet into a through hole formed in the rotating plate.

Figure 11:
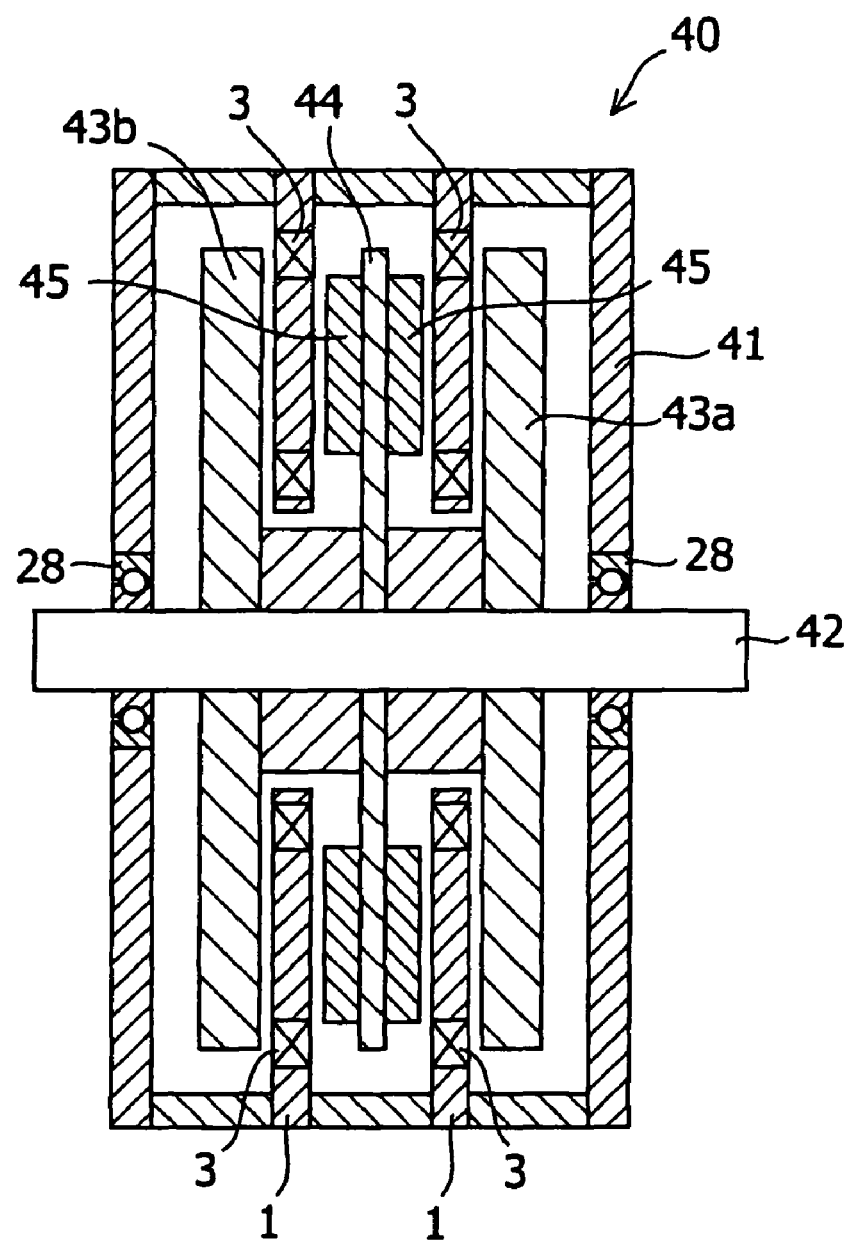
FIG. 11 is a schematic cross sectional view showing another aspect of an axial gap type rotating machine according to the present invention.

The axial gap type rotating machine 40 shown in FIG. 11 comprises: a housing 41; a rotating shaft 42 rotatably supported in the housing; first and second end rotors capable of rotating integrally with the rotating shaft, comprising respective end rotating plates 43a and 43b disposed to face each other with a gap therebetween in an axial direction of the rotating shaft 42; at least one double-sided magnet rotor comprising a rotating plate 44 disposed in an air gap formed between the first and second end rotors capable of rotating integrally with the rotating shaft, comprising the permanent magnets 45 disposed concentrically around the rotating shaft 42 on both sides of the rotating plate 44 so that the magnetic pole surfaces are positioned perpendicular to the rotating shaft; and a stator fixed to the housing, each stator disposed in an air gap formed between the first end rotor, said at least one double-sided magnet rotor, and the second end rotor, the stator comprising the fixing plates 1 and the coils 3 disposed circumferentially at the fixing plates so as to face circles of the permanent magnets.

Figure 12:
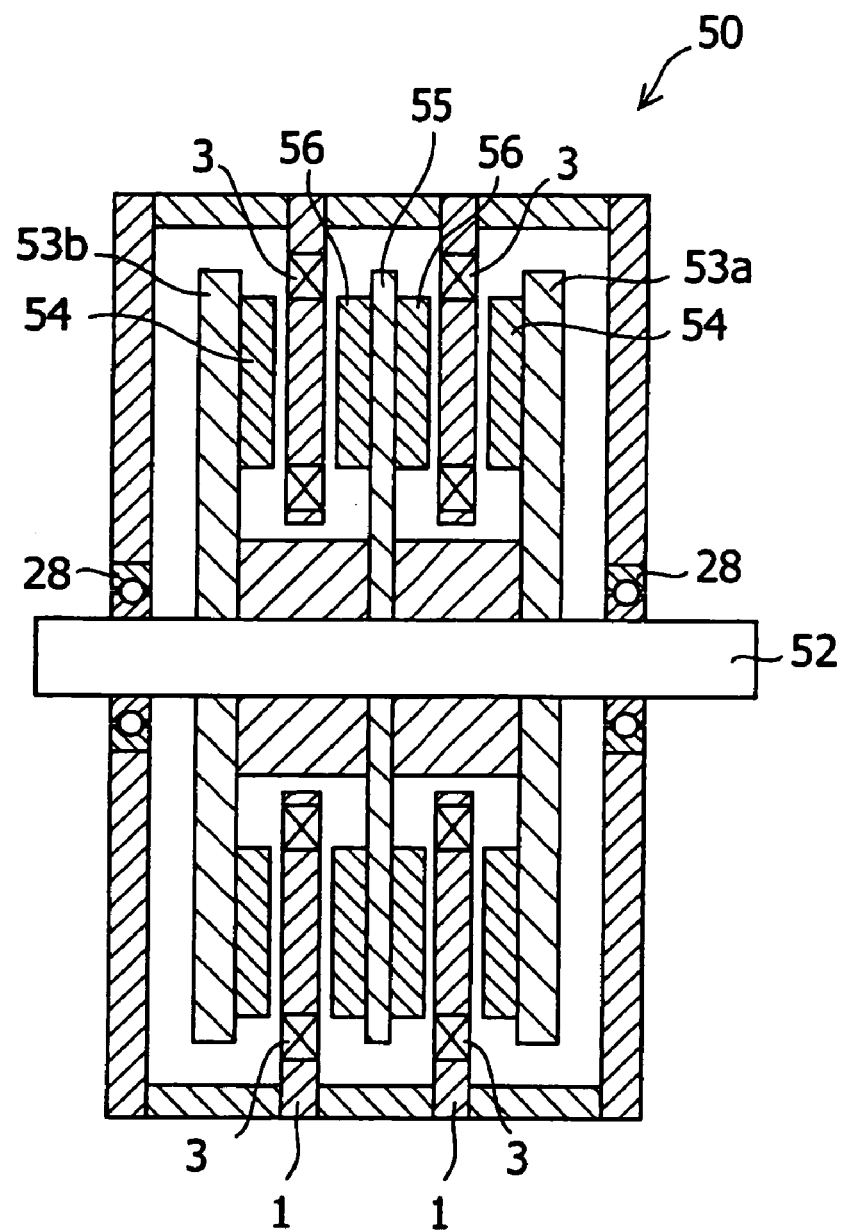
FIG. 12 is a schematic cross sectional view showing another aspect of an axial gap type rotating machine according to the present invention.

The axial gap type rotating machine 50 in FIG. 12 is different from the aspect shown in FIG. 11 in that the permanent magnets 54 are provided on the opposing faces of the end rotating plates 53a and 53b of the first and second end rotors so that the magnetic pole surfaces are positioned perpendicular to the rotating shaft.

When a plurality of rotors and stators are disposed in an axial direction as shown in FIG. 11 or 12, the output power increases as much as the number of coils, making a high-output rotating machine. The generators shown in FIGS. 11 and 12 comprise three rotors and two stators disposed therein. The number of stators is an integer equal to 2 or higher, and the number of rotors may be equal to the result obtained by adding one to the number of stators.

Hereinafter, the Examples will be described in detail. Although the description will be given of a case using the $Nd_2$—$Fe_{14}$—B base permanent magnets, the present invention is not limited to the Nd—Fe—B base magnets. The permanent magnet used in the present invention has properties, where Br: 13.7 kG, iHc: 16 kOe, and (BH)max: 46MGOe.

COMPARATIVE EXAMPLE 1

First, the generated energy and the loss were measured when the axial gap type rotating machine shown in FIG. 10 was used as a generator. The generator had a structure having 16 poles and 12 coils. FIG. 9 shows the rotor 25 obtained by disposing the permanent magnets 7 on the rotor yoke 27. As the rotor yoke 27, a disk made of a material of S15C and having a diameter of 200 mm and a thickness of 5 mm was used. As the permanent magnets 27, the Nd—Fe—B base magnets as described previously having a width of 20 mm, a length of 35 mm, and a depth of 3 mm in magnetization direction were used. On the surface of the rotor yoke 27, 16 magnets were disposed so that the magnetic pole surfaces of N-pole and S-pole alternated, and were adhered thereto with an elastic adhesive (EP001 of Cemedine Co., Ltd). The magnets were laid in such a manner that the magnets of opposite poles faced each other across the air gap as shown in FIG. 10. The size of the air gap was 8 mm in which the stator 1 was disposed.

As shown in FIG. 1, 12 pieces of coils 3, each of which was formed of 30 turns of winding on the coil base 2 made of Bakelite material having a thickness of 5 mm, were provided in the stator 1. The coils 3 were arranged in a triphasic star connection where four pieces of coils 3 were connected in series for each phase. Each of the coils 3 was fixed to the coil base 2 with an epoxy adhesive (EW2040 of Sumitomo 3M Limited). When the stator was built into the axial gap type rotating machine shown in FIG. 10, the cross section of the coil had a 5 mm side that was perpendicular to the magnetic pole surface of the permanent magnet and a 12 mm side that was parallel to the magnetic pole surface of the permanent magnet. In this comparison example, a string of conductor (made of cupper material and having insulating coating) having rectangular cross sections having a short side of 1.25 mm and a long side of 1.6 mm in cross section was used as a winding wire and was wound in the axial gap type rotating machine shown in FIG. 10 such that the short side in cross section of each coil winding wire was positioned perpendicular to the magnetic pole surface of the permanent magnet. The cross-sectional area of the winding wire was 2 $mm^2$.

Then, when the rotor of the resulting axial gap type generator was rotated at 3600 rpm with a load connected, a line current of 30 A, a line voltage of 100 V, and a triphasic power output of 5200 W were obtained. A torque meter was connected to the input side of the generator, and the input power of the generator was measured from the rotation speed and the torque. The input power was 6500 W. Since the copper loss of the winding wire was 300 W that was obtained from the resistance value thereof and the current value, it was confirmed that the remaining loss of 1000 W was attributed to the eddy current loss in the winding wire, and other losses such as a mechanical loss and a windage loss were on the level that could be almost neglected.

COMPARATIVE EXAMPLE 2

When a single string of coil conductor having a long side of 5 mm and a short side of 0.4 mm in cross section was provided into the axial gap type rotating machine shown in FIG. 10 as a winding wire, the coil conductor was wound such that the long side in cross section thereof was positioned perpendicular to the magnetic pole surface of the permanent magnet, and others were arranged in the same manner as in Comparative Example 1.

Then, when the rotor of the resulting axial gap type generator was rotated at 3600 rpm with a load connected, a line current of 30 A, a line voltage of 100 V, and a triphasic power output of 5200 W were obtained. At the same time, the input power was 5700 W. Since the copper loss of the winding wire was 300 W that was obtained from the resistance value thereof and the current value, it was confirmed that the remaining loss of 200 W was attributed to the eddy current loss in the winding wire. Consequently, it was also confirmed that, when the conductor of the winding wire is made smaller in a direction perpendicular to the air gap, the eddy current loss in the winding wire could be reduced.

EXAMPLE 1

The coil conductors, each having a long side of 5 mm and a short side of 0.1 mm in cross section, were bundled together in four rows by aligning the long sides thereof, and an assembly of conductors having a long side of 5 mm and a short side of 0.4 mm in cross section was obtained. An enamel coating was applied to the assembly to obtain the winding wire, and others were arranged in the same manner as in Comparative Example 2.

Then, when the rotor of the resulting axial gap type generator was rotated at 3600 rpm with a load connected, a line current of 30 A, a line voltage of 100 V, and a triphasic power output of 5200 W were obtained. At the same time, the input power was 5620 W. Since the copper loss of the winding wire was 300 W that was obtained from the resistance value thereof and the current value, it was confirmed that the remaining loss of 120 W was attributed to the eddy current loss in the winding wire. Consequently, it was possible to reduce the eddy current loss in the winding wire when compared with Comparative Example 2 and obtain a highly efficient generator.

EXAMPLE 2

The coil conductors, each having a long side of 1.25 mm and a short side of 0.4 mm in cross section, were bundled together in four rows by aligning the short sides thereof, and an assembly of conductors having along-side of 5 mm and a short side of 0.4 mm in cross section was obtained. An enamel coating was applied to the assembly to obtain the winding wire, and others were arranged in the same manner as in Comparative Example 2.

Then, when the rotor of the resulting axial gap type generator was rotated at 3600 rpm with a load connected, a line current of 30 A, a line voltage of 100 V, and a triphasic power output of 5200 W were obtained. At the same time, the input power was 5610 W. Since the copper loss of the winding wire was 300 W that was obtained from the resistance value thereof and the current value, the remaining loss of 110 W was attributed to the eddy current loss in the winding wire. Consequently, it was possible to reduce the eddy current loss in the winding wire when compared with Comparison Examples and obtain a highly efficient generator.

EXAMPLE 3

A total of 16 coil conductors, each having a long side of 1.25 mm and a short side of 0.1 mm in cross section, were bundled together in four lines and four rows by aligning the longer and short sides thereof, and an assembly of conductors having a long side of 5 mm and a short side of 0.4 mm in cross section was obtained. An enamel coating was applied to the assembly to obtain the winding wire, and others were arranged in the same manner as in Comparative Example 2.

Then, when the rotor of the resulting axial gap type generator was rotated at 3600 rpm with a load connected, a line current of 30 A, a line voltage of 100 V, and a triphasic power output of 5200 W were obtained. At the same time, the input power was 5550 W. Since the copper loss of the winding wire was 300 W that was obtained from the resistance value thereof and the current value, it was confirmed that the remaining loss of 50 W was attributed to the eddy current loss in the winding wire. It was not only possible to reduce the eddy current loss in the winding wire down to 1/20 when compared with Comparative Example 1 and down to 1/4 when compared with Comparative Example 2, but also possible to obtain a further highly efficient generator than the one in Example 1 or 2.

The invention claimed is:

1. An axial gap type rotating machine comprising:
a housing;
a rotating shaft rotatably supported in the housing;
two rotors capable of rotating integrally with the rotating shaft, the rotors disposed to face each other with a distance therebetween in an axial direction of the rotating shaft, comprising two rotating plates and permanent magnets disposed in a circle around the rotating shaft on at least one of opposing faces of the rotating plates so that magnetic pole surfaces of the permanent magnets are positioned perpendicular to the rotating shaft; and
a stator fixed to the housing, the stator disposed in an air gap formed between the rotating plates facing each other, comprising a fixing plate and coils disposed in a circle in the fixing plate so as to face the circle of the permanent magnets,
wherein each of the coils comprises a winding wire formed by a bundle of at least two coil conductors having rectangular cross sections by aligning at least one of long sides and short sides thereof, and the winding wire has an outer circumference covered with an insulating coating and is wound such that the long sides in cross section of the coil conductors are positioned perpendicular to the magnetic pole surfaces of the permanent magnets.

2. The axial gap type rotating machine according to claim 1, wherein each of the cross sections of the coil conductors has a shape in which the ratio of the length of the long sides to the length of the short sides is at least five.

3. The axial gap type rotating machine according to claim 1, wherein an outer circumference of each of the coil conductors is covered with an insulating coating.

4. The axial gap type rotating machine according to claim 1, wherein the length of the short sides in each of the cross sections of the coil conductors is not more than 0.5 mm.

5. An axial gap type rotating machine comprising:
- a housing;
- a rotating shaft rotatably supported in the housing;
- a first end rotor and a second end rotor capable of rotating integrally with the rotating shaft, each end rotor being disposed to face the other with a distance therebetween in an axial direction of the rotating shaft, each end rotor comprising end rotating plates;
- at least one double-sided magnet rotor capable of rotating integrally with the rotating shaft, each double-sided magnet rotor being disposed in an air gap formed between the first and second end rotors, the double-sided magnet rotor comprising a rotating plate and permanent magnets disposed concentrically around the rotating shaft on both sides of the rotating plate so that magnetic pole surfaces are positioned perpendicular to the rotating shaft; and
- at least two stators fixed to the housing, each stator disposed in an air gap formed between the first end rotor, the double-sided magnet rotor, and the second end rotor, each stator comprising a fixing plate and coils disposed in a circle in each of the fixing plates so as to face circles of the permanent magnets, wherein each of the coils comprises a winding wire formed by a bundle of at least two coil conductors having rectangular cross sections by aligning at least one of long sides and short sides thereof, and the winding wire has an outer circumference covered with an insulating coating and is wound such that the long sides in each of the cross sections of the coil conductors are positioned perpendicular to the magnetic pole surfaces of the permanent magnets.

6. The axial gap type rotating machine according to claim 5, wherein permanent magnets are further provided on opposing faces of the end rotating plates of the first and second end rotors such that magnetic pole surfaces of the permanent magnets are positioned perpendicular to the rotating shaft.

7. The axial gap type rotating machine according to claim 5, wherein each of the cross sections of the coil conductors has a shape in which the ratio of the length of the long sides to the length of the short sides is at least five.

* * * * *